Oct. 30, 1962 T. V. CRATER 3,061,814

ERROR DETECTION IN PSEUDO-TERNARY PULSE TRAINS

Filed Dec. 29, 1960 2 Sheets-Sheet 1

INVENTOR
T. V. CRATER
BY R. B. Ardis
ATTORNEY

Oct. 30, 1962 T. V. CRATER 3,061,814

ERROR DETECTION IN PSEUDO-TERNARY PULSE TRAINS

Filed Dec. 29, 1960 2 Sheets-Sheet 2

INVENTOR
T. V. CRATER
BY R. B. Ardis
ATTORNEY 3,061,814

ERROR DETECTION IN PSEUDO-TERNARY PULSE TRAINS

Theodore V. Crater, Whippany, N.J., assignor to Bell Telephone Laboratories, Incorporated, New York, N.Y., a corporation of New York Filed Dec. 29, 1960, Ser. No. 79,426
7 Claims. (Cl. 340—146.1)

Figure 1:
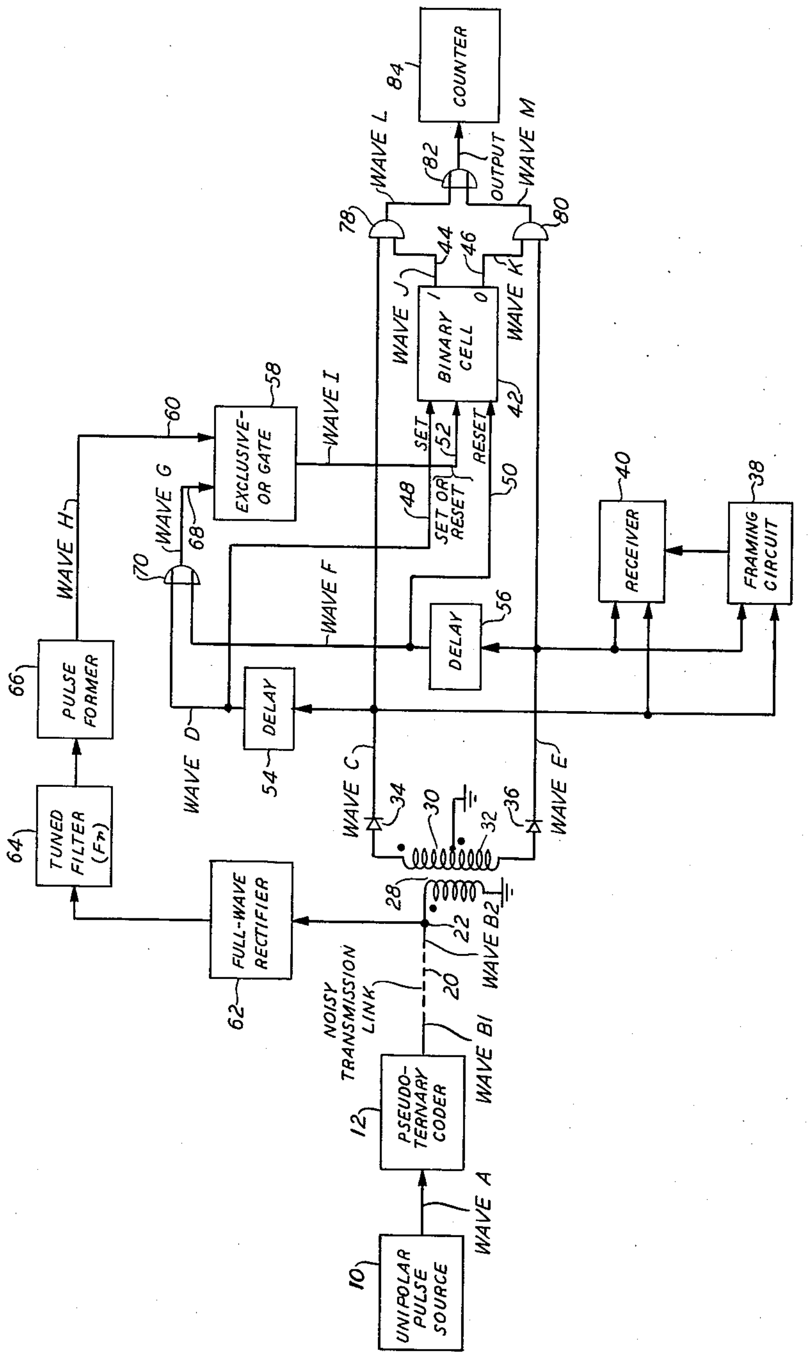

This invention relates to pulse code modulation and, particularly, to the detection and measurement of errors in a specially constrained code.

The specially constrained code with which we are here concerned is a pseudo-ternary code disclosed in the present inventor's copending application Serial No. 76,942, which was filed December 19, 1960. This pseudo-ternary code is such that any two successive pulses are constrained to be of the same polarity whenever the number of spaces intervening between them is even, and of opposite polarity whenever this number is odd. It will be recalled that a pseudo-ternary code may have a binary base and takes the form of a pulse train in which three predetermined levels of potential may occur only in accordance with some fixed law. The polarity constraint disclosed in the above-cited application is such a law. An authentic ternary code, on the other hand, has a ternary base and three predetermined potential levels which occur randomly.

That a code is pseudo-ternary does not, of course, render it immune from error. For example, spurious signals, such as noise bursts, may engraft themselves upon a pseudo-ternary pulse train during the course of its transmission from one point to another, and thereby alter the information content of the pulse train. Digital data communications are particularly susceptible to impairment by impulse noise—much more so than are voice communications, where the nature of the human ear and the redundancy of speech are countervailing factors. An error rate acceptable for encoded speech may be intolerable for digital data and, consequently, necessitate the addition of curative equipment.

It is therefore important in the installation and maintenance of pulse code systems to be able to detect and measure errors in the code. A circuit, suitable for such installation and maintenance purposes, ideally should be as simple operationally as a voltmeter. It should be capable of checking system performance anywhere along the path of transmission. Its use should not require an interruption of normal communication. It is the primary object of the invention to accomplish these ends.

The invention, although characterized by its simplicity, permits a ready and effective ascertainment of a system's rate of error. It is embodied in apparatus that recognizes errors in the particular pseudo-ternary code described in the present inventor's above-identified application. In one illustrative embodiment, these errors are detected by comparing, in an exclusive-OR gate, delayed replicas of the positive and negative pulses of the incoming pseudo-ternary train with a timing wave extracted from the train, using the output of this gate, as well as the aforementioned delayed replicas, to trigger a binary cell from one of its states of equilibrium to the other, and ascertaining any coincidence of positive incoming pulses with one of these states of equilibrium and of negative pulses with the other. This is, very briefly, the manner in which the specially constrained code may be checked to determine its authenticity.

Figure 2:
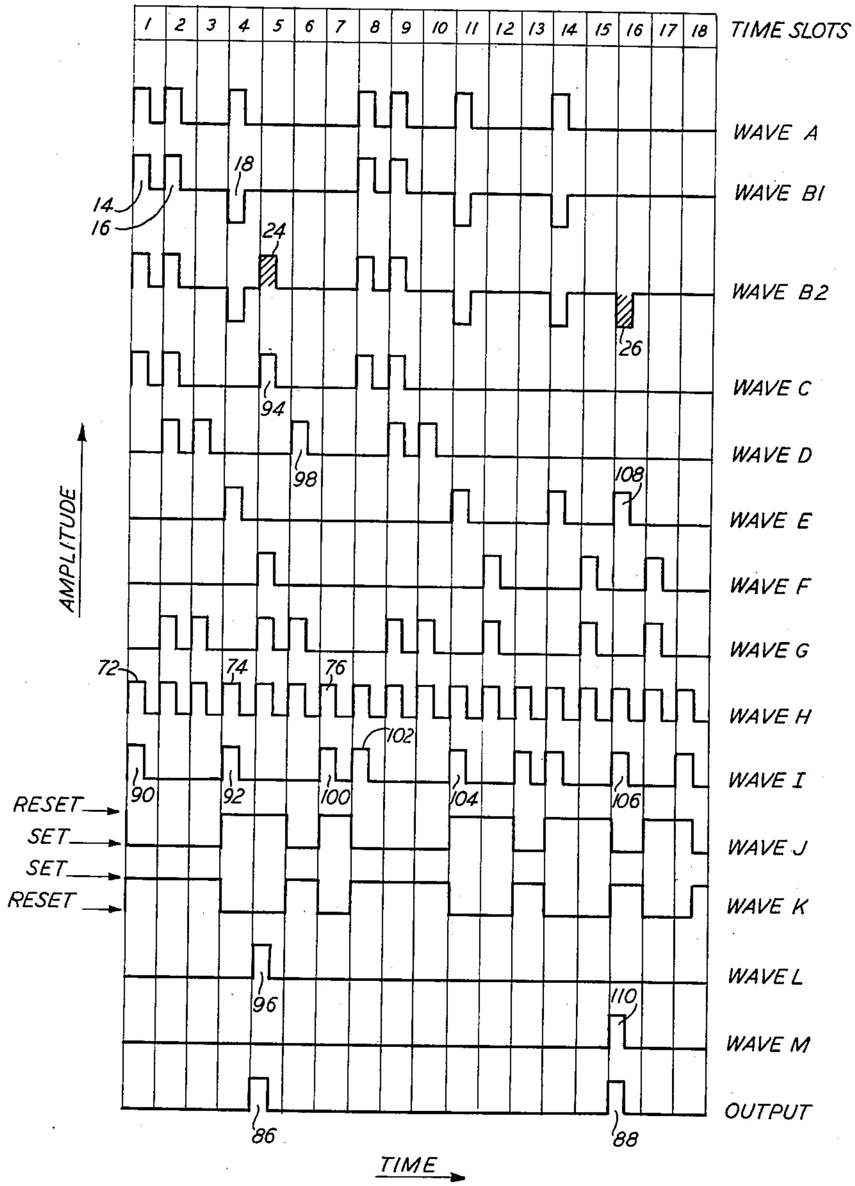

A better understanding of the invention will be imparted after considering the following more detailed description of an illustrative embodiment. In the drawings:

FIG. 1 is a block schematic diagram illustrating the principles of the invention; and FIG. 2 is a plot of wave forms manifest at various indicated points in FIG. 1.

In FIG. 1, a unipolar pulse source 10 supplies wave A (see FIG. 2) to a pseudo-ternary coder 12, which is of a type described in the above-cited patent application. The coder 12 converts wave A to a pseudo-ternary wave B1. As can be seen in FIG. 2, any two successive pulses of the wave B1 are constrained to be of the same polarity whenever an even number of spaces—that is, time slots unoccupied by pulses—intervenes between them. (The number zero is included within the class of even numbers.) When this number is odd, the pulses are constrained to be of opposite polarity. Thus, for example, no spaces intervene between the pulses 14 and 16 and, therefore, they are of the same polarity; but one space intervenes between the pulses 16 and 18, and their polarities are constrained to be opposite to one another, since the number one is odd.

The wave B1 must make its way over a noisy transmission path 20. When it finally arrives at the juncture 22 as the wave B2, two noise impulses, shown as the cross-hatched square pulses 24 and 26 in FIG. 2, are assumed to have engrafted themselves upon the wave. It remains to be seen how these errors will be detected and measured. It should be noted that noise impulses are ordinarily the cause of errors in the wave B2. If, however, the coder 12 were incorrectly to impose the above-described polarity constraint, so that, for example, the pulses 14 and 16 were of opposite polarity, such an error would also be ascertained in the circuit of FIG. 1.

The wave B2 proceeds into the primary of the transformer 28 and reappears as two separate waves in the secondary windings 30 and 32. As is indicated by the polarity markings of the transformer 28, the positive pulses of the wave B2 again appear as positive pulses in the secondary winding 30. The negative pulses of the wave B2 appear as positive pulses in the secondary winding 32. The diodes 34 and 36, which block negative pulses in the pulse trains that are fed to them, pass the waves C and E, respectively.

The framing circuit 38, which derives framing information from the waves C and E, synchronizes the receiver 40, wherein these waves are converted to whatever form desired. These circuits have been shown in order to place the present invention in a typical environment. Let us assume, for example, that the unipolar pulse source 10 converts an analogue message to a binary code, after which the pseudo-ternary coder 12 imposes the constraint already discussed above. If we assume further that this code is time-division multiplexed, it will be necessary, in order to convert this pseudo-ternary code to its original analogue form, to decode and demultiplex it. To decode the pseudo-ternary code to a binary code, it is only necessary to rectify the wave B2, and this is accomplished by transformer 28 and its associated diodes 34 and 36. In the receiver 40, the waves C and E are then decoded from binary to analogue form and then demultiplexed. It should be noted that the invention may be employed for error checking not only at a receiver in the communication system, but also at repeater points (not shown) along the transmission link 20.

The binary cell 42 is a bistable circuit having two states of equilibrium, one of which we shall call normal and the other abnormal. The cell switches from one state to the other whenever it receives a proper input stimulus. We shall assume that its normal state of equilibrium is such that its outputs 44 and 46 are in the binary one and zero states, respectively. Whenever the cell 42 is triggered from one of its states of equilibrium to the other, its outputs 44 and 46 will interchange their binary states. It will be triggered into its abnormal state of equilibrium whenever a pulse is supplied to its set input 48—assuming, of course, that it is not already in its abnormal state upon reception of the pulse. It will be triggered back into its normal state of equilibrium whenever a pulse is supplied to its reset input 50. The cell 42 also has a set-or-reset input 52, which is operative whenever impulsed to change the cell's state of equilibrium. In sum, the binary cell 42 will shift to its abnormal state of equilibrium in response to a stimulus at its input 48, will revert to its normal state in response to a stimulus at its input 50, and will change from the then-existing state of equilibrium to the other whenever a stimulus is supplied to its set-or-reset input 52.

The set input 48 is supplied by the wave D, the pulses of which are delayed replicas of pulses in wave C. The wave C is delayed by one time slot interval in the delay circuit 54.

The wave F, which comprises delayed replicas of the pulses in the wave E, operates the reset input 50 of binary cell 42. Wave E is delayed by one time slot interval in the delay circuit 56.

The wave I operates the set-or-reset input 52 of the binary cell 42. This wave is the output product of the exclusive-Or gate 58. As is well known, and inherent in its name, an exclusive-Or gate produces an output pulse when a pulse is supplied to one of its inputs only. For a more detailed description of the nature of the exclusive-Or gate, see, for example, Millman and Taub, "Pulse and Digital Circuits," page 421 (McGraw-Hill, 1956).

The exclusive-Or gate 58 has two inputs. One of these inputs, the input 60, is connected to receive a timing pulse train, which is shown as the wave H in FIG. 2. Wave H is derived from the wave B2 at the juncture 22. The wave B2 is rectified in the full-wave rectifier 62 and appears as a unipolar train of pulses at the tuned filter 64. Since it is tuned to the basic repetition frequency of the wave B2, the tuned filter 64 supplies a sinusoidal wave of that frequency to the pulse former 66, wherein the wave H is produced. The pulse former 66 may operate in conventional fashion to transform this sinusoidal wave into a periodic pulse train such as the wave H. The conventional method of doing this is to amplify the sine wave and then clip it at a level insuring brief rise and fall times, so that a substantially square wave is produced.

The other input of the exclusive-Or gate 58, the input 68, is connected to receive the wave G, a combination of the waves D and F. These waves are superimposed upon one another in the Or gate 70. As can be seen in FIG. 2, pulses appear in the wave I only in the absence of pulses in the wave G. Thus, for example, the timing pulses 72, 74 and 76 pass through the exclusive-Or gate 58 and appear in the wave I as the pulses 90, 92 and 100, respectively, since no pulses appear in the wave G at these times.

As a final step in the error detection process of the invention, it is necessary to compare the state of equilibrium of the binary cell 42 with the pulses that occur in the waves C and E. The wave C is associated with the output 44 of the binary cell 42. Associated with the output 46 of this cell is the wave E. Whenever an output is produced at either of the AND gates 78 or 80, this will be an indication of an error in the wave B2. The AND gate 78 is connected to receive the waves C and J. The wave J will cooperate to enable AND gate 78 only when the output 44 of the binary cell 42 is in the binary one state, i.e., when the binary cell 42 is in its normal state of equilibrium. Similarly, the AND gate 80 is connected to receive the waves E and K, and is in a condition to be enabled only when the binary cell 42 is in its abnormal state of equilibrium. As is well known, an AND gate will produce an output only when all of its inputs are simultaneously energized. Consequently, an output will be produced by the AND gate 78 only when a pulse occurs in the wave C and, simultaneously, binary cell 42 is in its normal state of equilibrium. Similarly, an output will be produced by the AND gate 80 only when, simultaneously, a pulse is present in the wave E and the binary cell 42 is in its abnormal state of equilibrium.

It was remarked previously that the pulses of wave E represent the negative pulses of the wave B2, and that the pulses of wave C represent the positive pulses of wave B2. Consequently, an error pulse will be produced at the output of the AND gate 80 and appear in the wave M whenever a negative noise pulse appears in the wave B2 and, simultaneously, the binary cell 42 is in its abnormal state of equilibrium. By the same token, an error pulse will appear in the wave L whenever a positive noise pulse appears in the wave B2 and the binary cell 42 is simultaneously in its normal state of equilibrium.

The waves L and M are combined in the OR gate 82 and thence supplied to a counter 84, wherein errors occurring in the pseudo-ternary wave B2 are recorded. The counter 84 may, for example, be an electronic digital counter of conventional design.

The output wave of FIG. 2 is thus representative of errors that appear in the wave B2. As can be seen, the output error pulses 86 and 88 represent the noise impulses 24 and 26, respectively. It will be helpful to trace the evolution of these output error pulses.

It should be noted that at the commencement of time slot 1, the binary cell 42 is in its normal state of equilibrium. Thus, the wave J is at a positive level and the wave K is at zero potential. To drive the binary cell 42 into its abnormal state of equilibrium, it is necessary, as we have seen, that a set pulse, which would appear in the wave D or in the wave I, be applied to either the set input 48 or the set-or-reset input 52. Such a pulse, the pulse 90, is present in the wave I and, thus, in the first time slot, the binary cell 42 is driven into its abnormal state of equilibrium. In order to drive the cell back into its normal state of equilibrium, a reset pulse must be applied to either the input 50 or the input 52 of the binary cell 42. No such pulse appears in the waves F and I during time slots 2 and 3. Upon the commencement of time slot 4, however, the pulse 92 of the wave I appears at the input 52 of the binary cell 42 and resets the cell so that it is driven into its normal state of equilibrium. The pulse 24, which we have identified as an erroneous inclusion in the wave B2, occurs during time slot 5 and is represented in the wave C by the pulse 94. Since at this time the output 44 of cell 42 is in the binary one state, as the wave J clearly shows, there is a concurrence of stimuli at the inputs of AND gate 78 and, consequently, the pulse 96 apears at the output of this gate. After passage through the OR gate 82, the pulse 96 appears in the output wave as the pulse 86, the first error pulse to be supplied to the counter 84.

In order to trigger the binary cell 42 into its abnormal state of equilibrium, it is necessary, as we have seen, that a set pulse be supplied to either the input 48 or the input 52. Such a pulse appears in time slot 6 as the pulse 98 in the wave D and it causes the binary cell 42 to revert to its abnormal state of equilibrium, as the wave J shows.

In time slot 7, the pulse 100 of the wave I appears at the input 52 of the cell 42, and this pulse drives the cell into its normal state of equilibrium. We see the pulse 102 driving the cell 42 back to its abnormal state of equilibrium during time slot 8. The cell remains in this state until time slot 11, at which time the pulse 104 causes the cell to revert to its normal state.

The process goes on in this fashion until we reach time slot 16. At that time the pulse 106 drives the binary cell 42 into its abnormal state of equilibrium so that its output 46 is in the binary one state. It is during this time slot that the noise impulse 26 occurs. This noise impulse is represented in the wave E by the pulse 108. The output 46 of the binary cell 42 is in the binary one state when pulse 108 occurs. Consequently, the AND gate 80 is enabled and a pulse 110, representative of the noise impulse 26, appears in the wave M. After passage through the OR gate 82, the pulse 110 appears as the pulse 88 at the counter 84, wherein it is registered. Thus, the circuit of FIG. 1 has determined that the noise impulses 24 and 26 were not in accordance with the pseudo-ternary code developed by the coder 12.

Although the principles of the invention have been described with reference to specific apparatus, it should be understood that other embodiments, within the spirit and scope of the invention, may occur to those skilled in the art.

What is claimed is:

1. In a pulse communication system wherein a train of unipolar pulses and spaces, encompassed by periodically recurrent time slots, is converted to a pattern of pseudo-ternary pulses, each being of the same polarity as its preceding neighbor if the number of intervening spaces is even or of opposite polarity if the number of intervening spaces is odd, apparatus for receiving said pattern of pseudo-ternary pulses and for detecting errors therein, comprising means for deriving from said received pulses a timing pulse train having the basic repetition frequency of said received pulses; means for segregating and converting the positive and negative pulses of said pseudo-ternary pattern to pulse trains of like polarity; a gate, having a pair of inputs, for supplying an output only when pulses appear at its inputs at different times; means, delaying the transmission of pulses by one time slot, for supplying said segregated and converted pulses of said pseudo-ternary pattern to one of the inputs of said gate; means for supplying said timing pulse train to the other of said gate inputs; a bistable circuit which changes its state of equilibrium in response to the output of said gate and has a pair of outputs alternately energized as it switches from one of its states to the other, each of said outputs being associated with one of said segregated pulse trains; means for detecting the simultaneous occurrence of pulses in either of said segregated pulse trains and the energization of its associated bistable circuit output; and means for determining the time rate of such occurrences.

2. A system, as defined in claim 1, in which said means for deriving said timing pulse train comprises a filter tuned to said basic repetition frequency.

3. A system, as defined in claim 1, in which said gate is an exclusive-OR gate.

4. Apparatus for detecting and measuring errors in a train of positive and negative pulses occupying time slots in which consecutive pulses are constrained to be of the same polarity where the number of intervening spaces is even and of opposite polarity where the number of intervening spaces is odd, comprising means for deriving from said train of pulses a timing wave whose frequency is the basic repetition frequency of said train, means for delaying each of said pulses for one time slot interval, gating means for comparing said timing wave with said delayed pulses and for passing said timing wave only in the absence of said delayed pulses, a bistable circuit triggered by said gated timing wave and changing its state of equilibrium in response thereto, means for measuring the time rate of stimuli supplied thereto, means responsive to the simultaneous occurrence of said positive pulses and one of the equilibrium states of said bistable circuit to stimulate said measuring means, and means responsive to the simultaneous occurrence of said negative pulses and the other equilibrium state of said bistable circuit also to stimulate said measuring means.

5. Apparatus for detecting and measuring errors in a pseudo-ternary train of pulses and spaces occupying time slots and constrained so that any two successive pulses are of opposite polarity only when they are separated by an odd number of spaces, comprising timing means for deriving a periodic train of timing pulses from said pseudo-ternary train having the same basic repetition frequency as that of said pseudo-ternary train, means for producing unipolar replicas of the negative and positive pulses of said pseudo-ternary train, means for delaying each of these replicas by one time-slot interval, a gate having a pair of inputs, one for receiving said timing pulses and the other for receiving said delayed replicas, said gate passing said timing pulses only in the absence of said delayed replicas, a binary circuit having two states of equilibrium switching alternately therebetween in response to the timing pulses passed through said gate and in response to said delayed replicas, means for ascertaining the simultaneous occurrence of one of said states of equilibrium and any positive pulse in said pseudo-ternary train, means for ascertaining the simultaneous occurrence of the other of said states of equilibrium and any negative pulse in said pseudo-ternary train, and means for counting these simultaneous occurrences.

6. Apparatus, as defined in claim 5, in which said timing means comprises means for converting said pseudo-ternary train to a unipolar train, a filter connected to receive said unipolar train and convert it to a sinusoidal wave having a frequency equal to the basic repetition frequency of said pseudo-ternary train, and means for converting said sinusoidal wave to a periodic unipolar pulse train having said basic repetition frequency.

7. Apparatus for detecting and measuring errors in a pseudo-ternary train of pulses and spaces, encompassed by time slots and constrained so that any two consecutive pulses thereof are of opposite polarity whenever the number of spaces intervening between them is odd and of the same polarity whenever said number is even, comprising means for conveying the positive and negative pulses of said pseudo-ternary train over separate paths; means for rectifying said separated pulses; means for delaying said rectified pulses by one time slot interval; means for combining said delayed and rectified pulses; a timing wave source periodically producing timing pulses at the basic repetition frequency of said pseudo-ternary train; an exclusive-OR gate having an output and a pair of inputs, one of which is connected to receive said timing pulses and the other to receive said delayed pulses from said combining means; a binary circuit having two states of equilibrium, a set input to effect its abnormal state of equilibrium, a reset input to return it to its normal state of equilibrium, a set-and-reset input to effect either state of equilibrium, and a pair of outputs that interchange binary states whenever said binary circuit undergoes a change of equilibrium; means for conveying the output pulses of said exclusive-OR gate to said set-and-reset input to change the state of equilibirum of said binary circuit; means for conveying the delayed and rectified pulses, formerly of one polarity, to said set input; means for conveying the delayed and rectified pulses, formerly of the other polarity, to said reset input; means for measuring the rate at which stimuli are fed into it; means responsive to the simultaneous occurrence of pulses of said one polarity in said pseudo-ternary train and said abnormal state of said binary circuit to stimulate said measuring means; and means responsive to the simultaneous occurrence of pulses of said other polarity in said pseudo-ternary train and said normal state of said binary circuit also to stimulate said measuring means.

References Cited in the file of this patent

UNITED STATES PATENTS 2,700,696 Barker ---------------- Jan. 25, 1955